(No Model.)
W. H. NELSON.
DRAFT ATTACHMENT FOR PLOWS.
No. 583,767. Patented June 1, 1897.
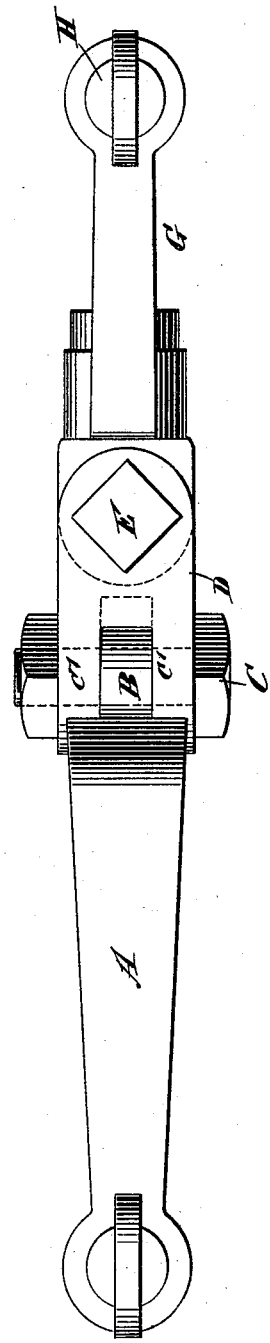
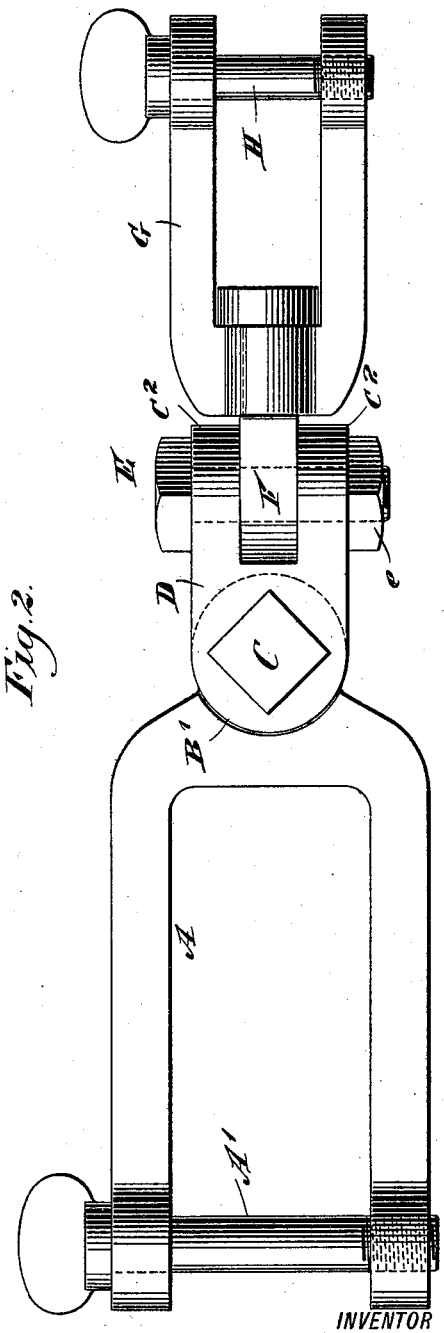
WITNESSES:
Edward Thorpe
H. L. Reynolds.
INVENTOR
W. H. Nelson.
BY
ATTORNEYS.

UNITED STATES PATENT OFFICE.

WALTER H. NELSON, OF NORTHPORT, MICHIGAN.

DRAFT ATTACHMENT FOR PLOWS.

SPECIFICATION forming part of Letters Patent No. 583,767, dated June 1, 1897.

Application filed October 23, 1896. Serial No. 609,827. (No model.)

*To all whom it may concern:*

Be it known that I, WALTER H. NELSON, of Northport, in the county of Leelanaw and State of Michigan, have invented a new and Improved Draft Attachment, of which the following is a full, clear, and exact description.

My invention relates to improvements in draft attachments for plows and agricultural machinery generally; and it consists of a certain improved combination of clevises and swivels of peculiar construction, which enables the connection to be bent in any direction desired, thus making the same flexible.

Reference is to be had to the accompanying drawings, forming a part of this specification, in which similar characters of reference indicate corresponding parts in both the figures.

Figure 1 is a top plan view of my device, and Fig. 2 is a side elevation thereof.

My device consists of the main clevis A, which is fixed upon the ordinary double-tree in the usual manner and is provided with a pin A', which is screwed into one side of the clevis in order to prevent it from being easily displaced. The outer end of this clevis is provided with a pivot-flange B, made narrower than the width of the clevis, and the body of the clevis is recessed slightly, as shown at B', to permit the end of the intermediate clevis to work therein. Pivoted upon this flange by the bolt C is the intermediate clevis D, consisting of a casing having double ears upon each end and pivot-holes therethrough at right angles to each other. The ears C' upon one end embrace the flange B and pivot upon the bolt C, and the other ears C² embrace the head of an eyebolt F, which forms a portion of the swivel, and pivoted on a bolt E, provided with a nut e. This eyebolt F passes through a hole in the clevis G, and said latter clevis is free to turn upon the bolt F as much as necessary.

The clevis G of the swivel is provided with holes in which is placed a pin H, by which attachment is made to the usual plow-clevis, and this pin also screws into one side of its clevis, similarly to the pin A'. This construction provides a connecting-rig which will permit of any amount of twisting or bending without becoming so tangled but that it will straighten out when power is again applied. The bolts C and E may be screw-threaded into one of the ears of the intermediate clevis D, if desired.

Having thus described my invention, I claim as new and desire to secure by Letters Patent—

1. A draft attachment comprising a clevis having a draft-pin connecting the open jaws and having at its other end a flange having a hole at right angles to the aforesaid pin, an intermediate link or clevis having holes in opposite ends at right angles to each other, a swivel-clevis having a draft-pin connecting its open jaws and an eyebolt forming the swivel, and pivot-pins connecting each end of the intermediate clevis or link respectively with the flange of the first clevis and the eyebolt of the swivel-clevis, substantially as described.

2. A draft attachment comprising a clevis having a hole through the body thereof at the central bend, an intermediate clevis having double jaws at each end, each pair of jaws being at right angles to the other, a swivel-clevis having an eye in the outer end of the swivel-bolt, the jaws of the intermediate clevis being perforated and adapted at each end to embrace the central bend of the first clevis and the eye of the swivel-bolt, and pivot-pins adapted to enter said holes and join the parts together, substantially as described.

WALTER H. NELSON.

Witnesses:
S. W. PORTER,
AMOS BARTLETT.